INVENTOR
W. T. FURGERSON

BY
Schellin & Hoffman
ATTORNEYS

Jan. 26, 1971  W. T. FURGERSON  3,558,481
METHOD FOR THE SEPARATION OF LIQUIDS
Filed Feb. 4, 1969  3 Sheets-Sheet 3

CONCENTRATION $C_2$ WITHDRAWN FROM SIDE 1 AT POINT $X_2$ AND INTRODUCED IN SIDE 2 AT POINT $X_3$ IS IN EQUILIBRIUM WITH THE REMAINING SOLUTION IN SIDE 1 AT POINT $X_3$

INVENTOR
W. T. FURGERSON

BY *Schellin & Hoffman*
ATTORNEYS 3,558,481
METHOD FOR THE SEPARATION OF LIQUIDS
William Thomas Furgerson, 20 Rainier Court,
York, Pa. 17402
Filed Feb. 4, 1969, Ser. No. 796,452
Int. Cl. B01d 13/00
U.S. Cl. 210—22     3 Claims

ABSTRACT OF THE DISCLOSURE

An improved method and apparatus for separating a solvent from the solution which comprises imposing a temperature difference between a more concentrated and less concentrated solution separated by a permeable membrane thereby creating a free energy driving force.

BACKGROUND OF THE INVENTION

This invention relates to improved methods and apparatus for the separation of solvents from solutions. More particularly, this invention relates to the separation of solvents from solution employing semi-permeable membranes and free energy driving forces created by temperature differences.

A solvent can be separated from a solution by a reverse osmosis process in which a mechanical pressure difference is employed to force solvent through a semi-permeable membrane. However, since semi-permeable membranes are typically thin and therefore fragile, osmosis processes utilizing mechanical pressure differences encounter difficult problems in supporting membranes against the necessary pressure difference. Therefore, it is highly desirable to develop processes utilizing driving forces other than mechanical pressure which can make separation of solvents from solutions by semi-permeable membranes more feasible and practical.

Recently workers in the art have discovered methods for separating solvents from solution employing semi-permeable membranes which do not function through the use of mechanical forces but rather employ thermal forces. Thus Lazare in U.S. Pat. No. 3,276,996 discloses a method of separating water from salt solutions using special kinds of membranes and using free energy driving forces created by establishing a temperature differential. Briefly, the theory upon which such processes operate is founded in chemical thermodynamics and thermo chemical reactions. That is, given processes will go forward if the products have a lower free energy content than the initial components. The pressure difference employed in prior art processes is one way of imposing a free energy difference that is favorable to separating a solvent from solution by reverse osmosis. Another method utilizes a free energy difference imposed by creating different temperatures on the two sides of a semi-permeable membrane. This free energy difference imparts a driving force in direction of the side having lower free energy, the result being a movement or transfer of liquid through the membrane and ultimately a physical separation of solvent from solution. Obviously, the required temperature differential can be achieved by either heating or cooling.

A more detailed description of the principle of thermo diffusion can be found in an article by G. Langenhammer et al., Zeitschrift für Elektrochemie, volume 62, pages 458–480, 1957; and R. Hasse, Zeitschrift für Phys. Chemie, volume 21, pages 244–269, 1959; and R. Hasse et al., id. 270–297, 1959.

In employing such a thermo diffusion process there is movement of the solvent from the solution through the membrane. This movement will tend to decrease and eventually as the teperature on the opposite sides of the membrane equalize due to flow of heat through the membrane. Additionally, the process tends to be arrested by an increase of solute in a boundary layed of solution which forms next to the semi-permeable membrane. This phenomena causes the solution next to the membrane to have a higher concentration of solute than the average bulk of the solution and results in lower driving forces to effect flow through the membrane than would be the case if the membrane were exposed to solution at average concentration. Another factor that reduced the effectiveness of such a process is the flow of the heat through the membrane by the usual heat transfer conduction and convection processes and by the heat capacity of the solvent passing through the membrane.

DESCRIPTION OF THE INVENTION

An improved method and apparatus has now been discovered which overcomes the above-noted problems encountered when utilizing thermo diffusion techniques.

FIG. 1 is a schematic illustration of one embodiment of the process of this invention employing a source of cool concentrated solution and a stream of solution having a lower concentration warmed by an external heat source.

FIG. 2 graphically illustrates in a qualitative manner the effect counter current flow has upon the thermal drive force employed in this invention.

Figure 7:
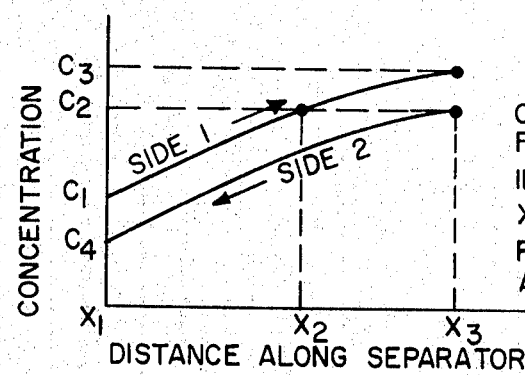

FIG. 7 graphically illustrates the advantages obtained employing a counter-current wherein a given solution undergoes a concentration change.

Figure 8:
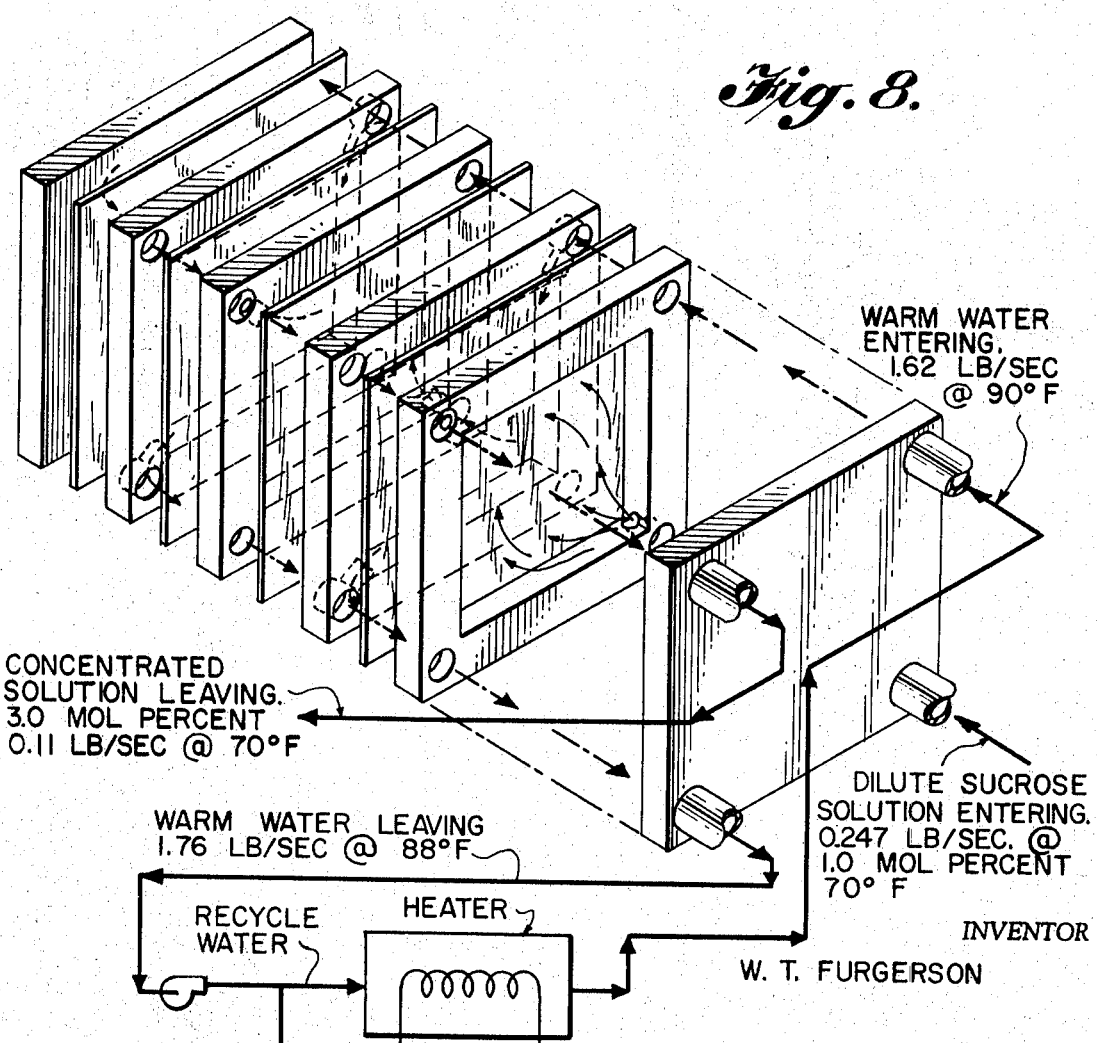

FIG. 8 illustrates an application of the processes of this invention employing solar energy as a heat source.

In a conduit in which fluid is flowing from a region of low temperature to a region of high temperature, heat will tend to be conducted from the high to the low temperature region while the flow of fluid will tend to transport heat toward the high temperature region. Thus the two heat transfer mechanisms tend to oppose each other. If the fluid flow velocity is higher than a specified critical amount, flow of heat by conduction in the direction opposite to fluid flow will be arrested. If a membrane is placed across the conduit, a system is obtained which is analogous to a mass transfer device using free energy forces to cause flow of solvent through a semi-permeable membrane as described in the prior art. The critical velocity through the membrane required to prevent heat leakage by conduction can be calculated by equating heat flow by transport, to heat flow by conduction as follows:

(1) $$\frac{dT}{dY} - \frac{GCp}{k} T = 0$$

where:
T is temperature, deg. F. absolute
G is mass velocity through the membrane, lb./ft.$^2$ sec
Cp is specific heat of the fluid, B.t.u./lb. deg. F.
k is conductivity of the fluid B.t.u./ft. sec F°. This can be static conductivity or eddy conductivity, depending on conditions
Y is linear dimension in the direction of flow Solution of the heat balance Equation 1 to give the critical mass velocity yields:

(2) $$\ln \frac{T_2}{T_1} = \frac{GCp}{k} Y$$

(3) $$G_c = \left(1 - \frac{T_1}{T_2}\right) \frac{k}{CpY}$$

If the mass velocity of solvent through the semipermeable membrane is equal to or greater than $G_c$ as calculated above in Equation 3 there will be no heat leakage from the warm to the cool side of the membrane. If the mass velocity of solvent through the membrane is greater than $G_c$, a stable situation will exist wherein the temperature interface will move to the warm side of the membrane with increasing flow. This decreases the driving force which in turn results in a lower mass velocity so that the temperature interface will reestablish itself at a point close to the membrane where the effective driving force will be greater. Under this condition any disturbance or imbalance in temperature or flow gives rise to compensating forces that tend to stabilize the system. The opposite effect is true if the mass velocity is less than $G_c$. In this case the temperature interface will be on the cool side of the membrance where a decrease in mass velocity will cause it to move away from the membrane giving a reduction in driving force and a further reduction in mass velocity. In this situation any disturbance gives rise to forces which tend to drive the system in the direction of the initial disturbance.

Where the system is operating in the stable region described above, there will be no heat leakage from the warm to the cool side of the membrane, but the warm side temperature will be degraded by the influx of cool solvent. This results in a loss of driving force which can be countered by addition of heat to the warm side. The energy requirement of the process per unit weight of solvent transfer will be (4) $$Cp \ (T_2 - T_1)$$

plus external loses. An additional reduction in effective driving force can occur due to the build up of a solute-rich boundary layer on the solution side of the membrane thus increasing the effective concentration difference across the membrane. Boundary layers on either side of the membrane can be controlled by turbulent mixing which is effected by natural turbulence or by promoting devices.

It should be noted, that for simplicity the above description has been confined to cases wherein the concentrated solution is at a lower temperature than the dilute solution or pure solid. The same principles and reasoning apply when the temperatures are reversed.

Figure 1:
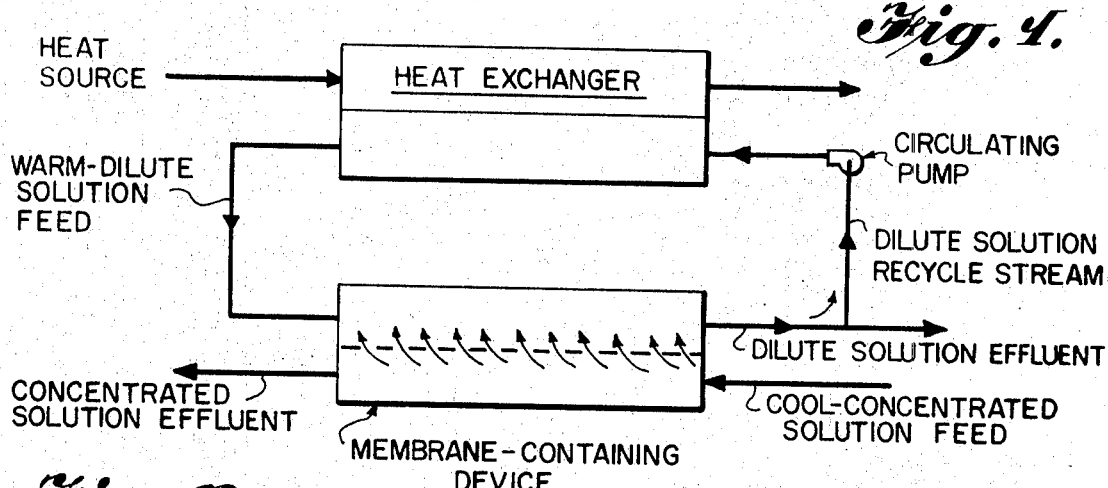
Figure 2:
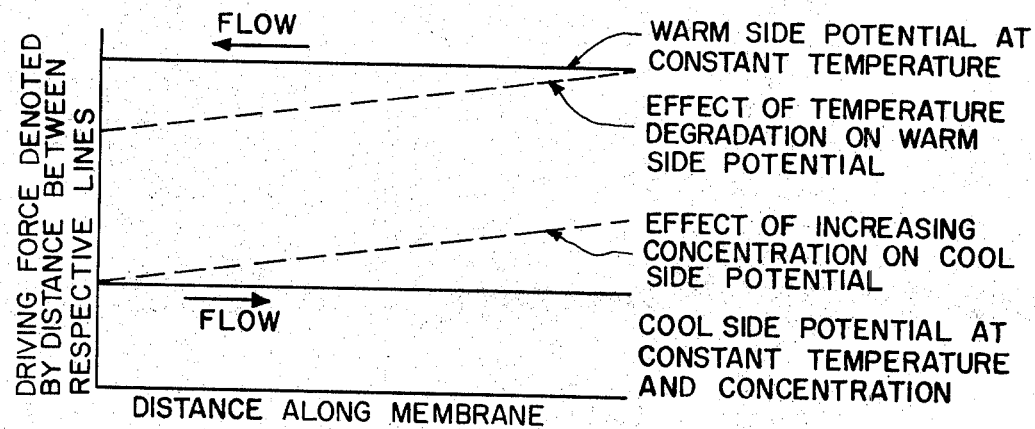

Broadly speaking, maintenance of a driving force temperature difference across the membrane can be accomplished by either external or internal heating or cooling. As shown in FIG. 1 a process can be arranged in which a source of cool concentrated solution exists and a stream of solution having lower concentration is warmed by an external heat source. The two streams are passed through the device containing the membrane, the latter being suitably arranged and supported, in a counter-current manner. Counter-current flow enables the temperature degradation as the warm side stream flows through the device to be bound in part by the rise in average concentration on the cool side, thus tending to maintain a constant driving force across the membrane. The effect on driving force is shown qualitatively in FIG. 2.

Figure 3:
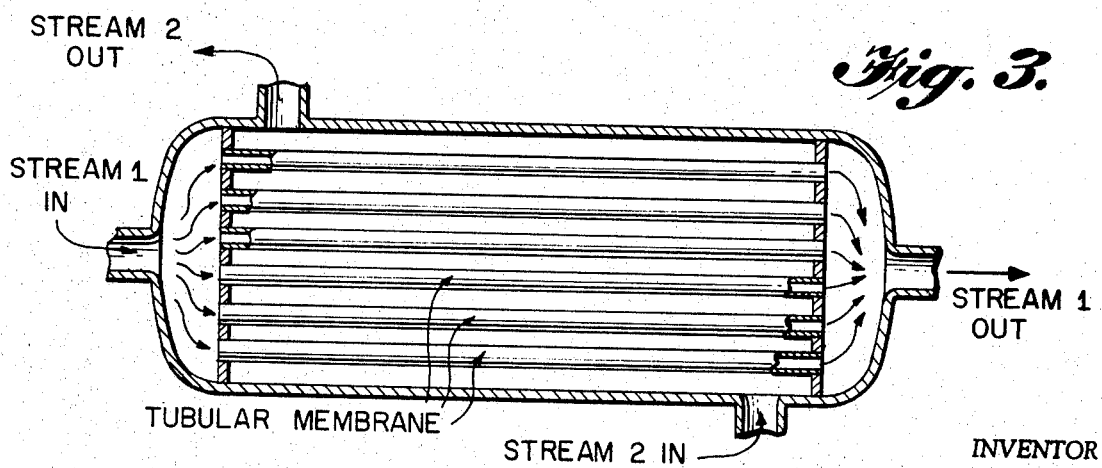
FIG. 3 illustrates a shell containing membrane device in the form of tubes with the membrane made up as a composite structure of semi-permeable separating layer integral with supporting layer.

One embodiment of the membrane containing device is shown in FIG. 3 as a shell containing membrane in the form of tubes with the membrane made up as a composite structure of a semi-permeable separating layer integral with a supporting layer. As an alternative, the membrane may be supported by a separate porous structure.

Figure 4:
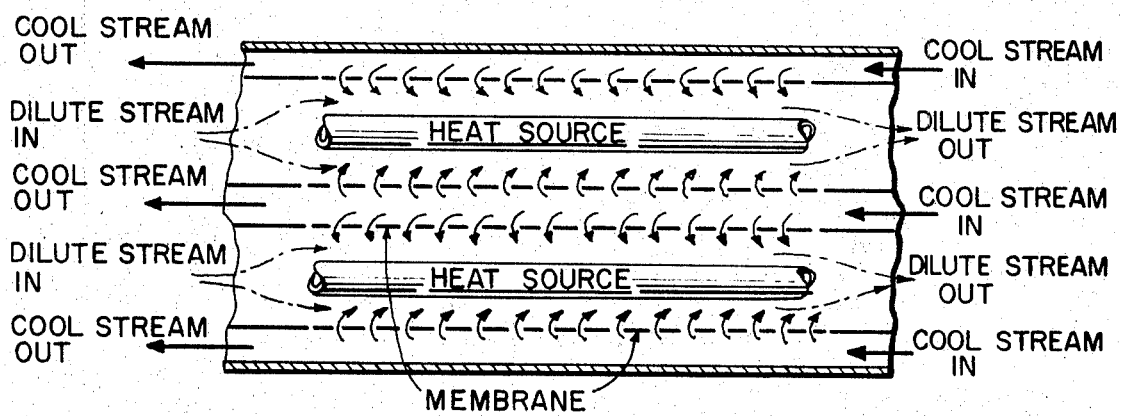
FIG. 4 illustrates another embodiment of the process of this invention wherein heat is added to the system by heat transfer surfaces built into a membrane containing device.

As shown in FIG. 4 the process can be arranged so that temperatures can be maintained by adding heat to the warm side or removing it from the cool side by heat transfer surfaces built into a membrane containing device. The heat transfer surfaces may be heated or cooled by external sources of warm or cool fluids, or the warm side may be heated electrically. With either external or internal heating and cooling a heat pump may be used to upgrade the heat of the effluent warm side stream and return it to the process. Thus the use of solar energy is made feasible by this device by the low temperature at which the thermo-free energy separation process operates.

There are many possible embodiments in application of this invention. Any combination of solvent and solute can be used provided a favorable free energy driving force can be imposed by a temperature difference. For instance, in a sodium chloride-water system a favorable free energy difference results when the more concentrated solution is at a lower temperature. For other solvent solute combinations or at other conditions, the temperature difference for a favorable free energy difference may be reversed. Moreover, different membrane materials may be used depending on the economics and materials of the process. Different arrangements of the membrane material and different methods of boundary layer control may be used depending on the materials and the scale of the process. Such variations do not depart from the basic principles of this disclosure.

Figure 5:
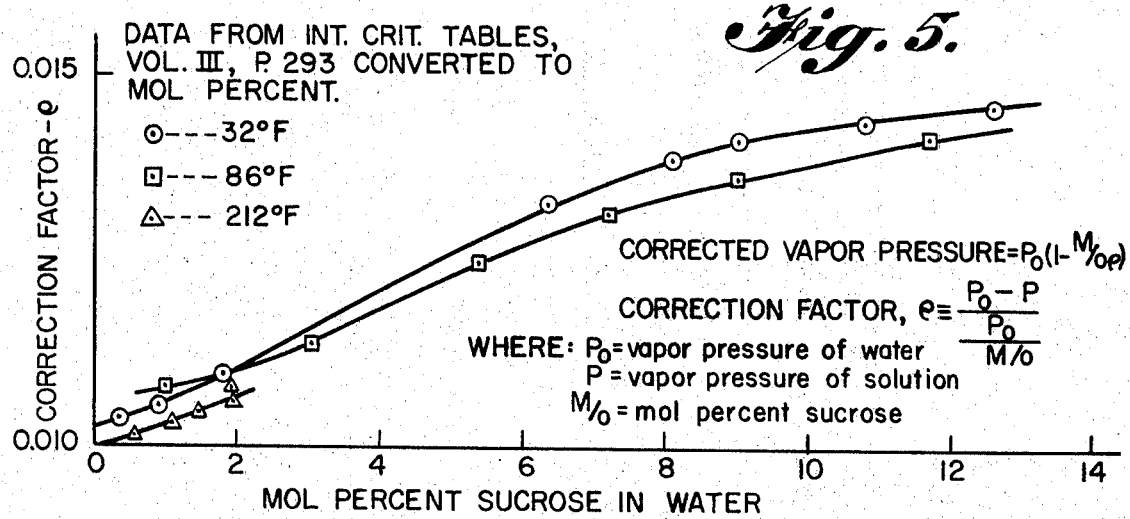
FIG. 5 is a data plot obtained from International Critical Tables, volume 3, page 293 to obtain the vapor pressure of sucrose-water solutions.

The following specific example will further serve to illustrate and explain my invention. This example illustrates a process for effecting separation of a solvent from its solution by diffusion through a semi-permeable membrance under a free energy driving force caused by a temperature difference. The solute-solvent combination described below is sucrose-water, however, the method of the present invention can be used equally as well for any solute-solvent system. Data from International Critical Tables, volume 3, page 293, converted to engineering units and plotted in FIG. 5, indicate the vapor pressure of sucrose-water solutions can be approximated by the following equation:

(5) $$P = Po \ (1 - 0.011 \ m/o)$$

for concentrations between 0 and 4 mole percent and temperatures between 32 and 212° F. where P = vapor pressure of solution at any temperature
Po = vapor pressure of water at the same temperature
m/o = mole percent sucrose in solution The number 0.011 in Equation 5 is an empirical correction factor. If the concentration range of interest extended over a wider range than approximately 4 mole percent, the simple correction factor should be replaced with an equation giving the correction factor as a function of temperature. For simiplicity, this example has been chosen so that the simple correction factor applies.

Assume also that a 2 mole percent sucrose-water solution is being concentrated by forcing part of its water through a semi-permeable membrane into a stream of pure water. The following equation gives the net free energy difference between two streams of different temperature and concentration as:

(6)
$$\Delta F_{net} = RT_2 \ln \frac{f(N_2)}{f(N_1)} e^{\frac{L\lambda}{R}\left(\frac{1}{T_1} - \frac{1}{T_2}\right)} - S_1(T_2 - T_1)$$
$$- JmCpT_2 \ln \frac{T_2}{T_1} + JmCp(T_2 - T_1)$$

where:

R is the universal gas constant, 1545 ft. lb./lb. mol deg R.
$T_1$ is temperature on the high concentration side, deg R.
$T_2$ is temperature on the low concentration side, deg R.
$Lv$ is the latent heat of vaporation of water
$S_1$ is the absolute entropy of water at temperature $T_1$
$JmCp$ is the molar heat capacity of water vapor $N_1$ is mole fraction of solvent on high concentration side
$N_2$ is mole fraction of solvent on low concentration side Solving for $f(N_2) = Po[1-(0.011 \times 0)] = Po$
Solving for $f(N_1) = Po[1-(0.011 \times 2)] = 0.97 Po$ If $T_1$ is 70° F. or 530° R., at this temperature
$S_1 = 35,000$ ft. lb./lb. mol deg R. and
$Lv = 14.69 \times 10^6$ ft. lb./lb. mol If $T_2$ is successively 70, 80, 90 and 100° F. or 530, 540, 550 and 560° R. and these values are substituted in Equation 6 and Equation 6 is solved the following data, set forth in Table 1, is obtained:

TABLE I

| $T_2$ degrees R. | $\Delta F_{net}$ ft. lb./lb. mol. | $\Delta P$ equivalent p.s.i. |
|---|---|---|
| 530 | +18,212 | -437.7 |
| 540 | -55,206 | +1,327 |
| 550 | -129,208 | +3,106 |
| 560 | -204,385 | +4,913 |

From the data contained in Table I it can be seen that when the temperatures $T_1$ and $T_2$ are equal a free energy difference exists which is equivalent to a pressure difference of 437.7 lb./sq. in. If the two solutions were separated by a semi-permeable membrane an osmotic pressure would exist in the direction tending to force water to flow the low concentration to the high concentration side. As the temperature of the low concentration side is increased the equivalent driving force pressure reverses in sign and becomes a driving force in the direction tending to force water to flow from the high concentration side to the low cocnentration side. This driving force can be used to separate the solvent from its solution by forcing the solvent through a semi-permeable membrane without any application of mechanical pressure.

In a case in which the high concentration side consists of 2 mol percent sucrose in water at 70° F. (530° R.) and the low concentration side is water at 90° F. (550° R.) from Table I the calculated equivalent pressure driving force is 3,106 lb./sq. in. Using a typical membrane permeability of $1.0 \times 10^{-5}$ cm.³/atm. sec cm.² which is equivalent to $2.23 \times 10^{-8}$ ft.³/p.s.i. sec ft.² the flux of water through the membrane will be $$G = 2.23 \times 10^{-8} \times 62.4 \times 3106$$

or $G = 43.1 \times 10^{-4}$ lb./ft.² sec. This flux will be maintained only as long as the assumed conditions hold, namely 2 mol percent concentration difference across the membrane and 20° F. temperature difference. Two phenomena act to change the concentration and temperature differences in the direction tending to decrease the water flux through the membrane. More particularly these are the solute concentration boundary layer and the flow of heat through the membrane from the low concentration warm side to the high concentration cool side. If the flow of solution along the high concentration side is maintained at a Reynolds number (The critical velocity range above which a liquid flow will be turbulent, below which it will be viscous, and in which it may be either viscous or turbulent, depending on the velocity of flow, the size or shape of the conduit and the viscosity of the liquid. It is given by the ratio:

$$\frac{\text{Scale velocity} \times \text{scale length}}{\text{kinematic viscosity})}$$

of 10,000 the laminar sub-layer thickness will be 0.0033 ft. thick as calculated from the Martinelli universal velocity profile. Taking Equation 3 previously set forth and making the appropriate substitutions gives:

$$Gc = \left(1 - \frac{530}{550}\right) \frac{1.0 \times 10^{-4}}{1.0 \times 0.0033}$$

$$Gc = 11.0 \times 10^{-4} \, lb./ft.^2 \, sec$$

The above equations give the critical water flux required to prevent heat leakage in the warm low concentration stream to the cool high concentration stream. Any flux equal to or higher than this will result in a stable process. Since the calculated flux for this example is 0.0043 and the critical flux for stability is 0.0011, the system is stable. If for some reason such an increased concentration difference, decreased membrane permeability or different properties of the solution or solvent, the actual flux were decreased or the critical flux were increased so that the critical flux became greater than the actual flux the process would be unstable. Given such a situation the process would be made stable by any one or combination of the following means:

(1) Increase membrane permeability, this method being limited by available membranes.

(2) Decrease the thickness and concentration of the solute-rich boundary layer on the high concentration side. This can be done by increasing mixing action in the direction perpendicular to the membrane by increased Reynolds number or by use of artificial turbulence promoting devices such as roughened or wavy surfaces or by vortex generators.

(3) Increase the effective driving force by addition of another solute to the low concentration stream. For example, sodium chloride could be added to the low concentration side to obtain a more favorable free energy gradient from the high sucrose concentration stream to the low sucrose concentration stream.

Figure 6:
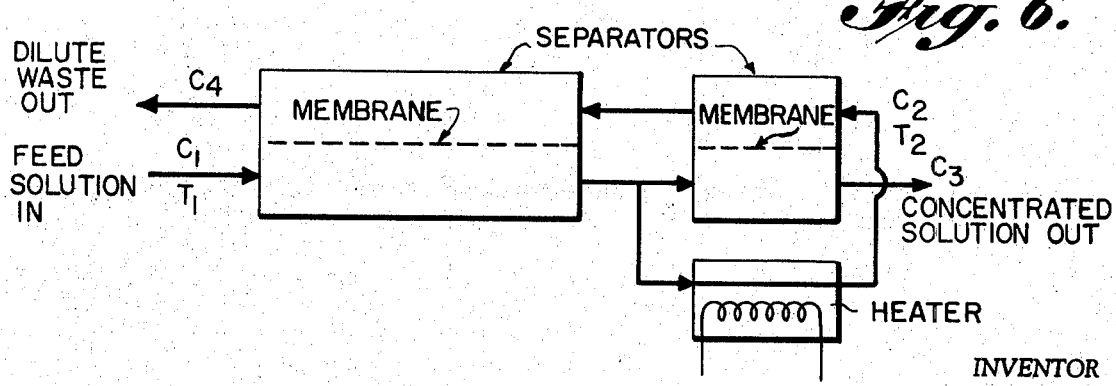
FIG. 6 illustrates the effective driving force obtained by the process of this invention by employing counter-current fluid streams and multiple separations.

(4) Increase the effective driving force by using a counter-current process as set forth in FIG. 6.

In the process as shown schematically in FIG. 6 feed solution is introduced into the separator which contains a semipermeable membrane, at temperature $T_1$, the cool temperature, and concentration $C_1$. As the solution passes along the membrane, it loses solvent through the membrane and is increased in concentration. At an appropriate point part of the solution is withdrawn at concentration $C_2$, heated and reintroduced into the separator on the opposite side of the membrane as a recycle stream. The remainder of the solution continues through the separator being further concentrated and finally emerging as concentrated product. The heated recycle stream collects solvent as it proceeds through the separator in a direction to the feed stream. As it collects solvent it becomes more diluted and emerges as dilute waste. The advantage of the counter-current process is that a stream can be taken through a given concentration change, e.g., from $C_1$ and $C_3$ while the concentration difference across the membrane at any point is less than the concentration change as illustrated in FIG. 7. It is important to properly choose the point at which the recycle stream is withdrawn from the feed stream. A recycle stream could be obtained by diverting part of the product, but this would be thermodynamically wasteful. By picking the withdrawal point so that the concentration is in equilibrium with the product concentration at the desired flux and temperature difference a recycle stream can be obtained without the waste involved in overconcentrating it to product concentration. The above illustration is given for a case where concentrated solute is the desired product. The process of the invention will also work where the diluted solvent is the product and concentrated solute is waste.

It should be remembered that keeping the actual flux higher than $G_c$ as defined previously is important if the process is to be practical. The process will work at lower fluxes, but the resulting heat leakages would make the process inefficient. If the flux is kept above the critical value the case used for illustration could remove water from the solution at a cost in heat of approximately 20 B.T.U. per pound as compared to 200 B.T.U. per pound for typical multiple effect evaporation techniques presently in use. Furthermore, since no vapor is involved, equipment can be smaller than standard evaporation equipment, and the required temperature is so low that waste heat can be used. Thus my process could make the use of solar energy practical.

For example, taking the assumed calculated values for the given example:

2 mol percent, sucrose-water at 70° F. high concentration side
90° F. water, low concentration side
0.0043 lb. sec per sq. ft. membrane, calculated flux 10,000 Reynolds number one concept of the use of solar energy would be as shown in FIG. 8. In this embodiment conditions permit flow through the membrane to exceed the critical value $G_c$ calculated by Equation 3, required to prevent heat leakage through the membrane. Therefore, no special means of flux augmentation, as previously described, are required. The temperature drop in the warm stream caused by influx of the separated water, is only 2° F. This indicates that internal heating to maintain water temperature is not needed.

From the above illustrations and embodiments the advantages of employing the process of this invention will be seen as follows: (1) Effective use of heat energy is obtained. For aqueous solutions multiple effect evaporators presently in use, use on the order of 200 B.T.U. per pound of water separated. Multi-stage flash separators use typically 120 to 140 B.T.U. per pound of water separated. The thermal free energy process example illustrated herein has a theoretical energy consumption of only 20 B.T.U. per pound of water. Even if this is doubled to allow for losses the resulting energy consumption is much less than processes now in use. (2) Heat with a lower order of availability, and therefore, low cost can be used. (3) Equipment is small because there is no vapor phase, and the amount of solvent separated per unit area of active surface is the same order as that obtained in conventional evaporation processes. (4) The process will work with non-ionic solutes with which electrodialysis techniques cannot be used. (5) Because the process will work at room temperature it can be used with materials that are subject to thermal decomposition, for example, it could be used to concentrate orange juice without loss of vitamin C. (6) Due to the fact that membranes can be chosen for selectivity, the process can be used to separate one solvent and leave behind another which would also be removed by an evaporation process, for example, water could be removed from an alcohol-water solution.

While there have been shown and described particular embodiments of the invention, it will be obvious to those skilled in the art that various changes and modifications may be made therein without departing from the invention, and, therefore, it is aimed to cover all such changes and modifications as fall within the true spirit and scope of the invention.

I therefore claim as my invention

1. In a process for separating a solvent from a solution by imposing a temperature difference between a first solution of one concentration and a second solution of different concentration said solutions separated by a semipermeable membrane thereby creating a free energy difference between said solutions, the improvement which comprises; minimizing heat leakage through said membrane by adjustment of the face velocity of solvent through said membrane relative to the propagation velocity of temperature through said solution, said face velocity always being maintained higher than said temperature propagation velocity by controlling membrane permeability and effective concentration difference and effective temperature difference and flow passage geometry.

2. The process of claim 1 wherein said first solution flows countercurrent to said second solution.

3. The process of claim 1 wherein said effective concentration difference is controlled by recycle of a fraction of one of said solutions said fraction being withdrawn at a point of appropriate concentration and introduced on the opposite side of said membrane, said point of withdrawal being a point where concentration is in equilibrium with the combination of temperatures, concentrations and solvent flow through the membrane existing at the point of introduction.

References Cited
UNITED STATES PATENTS

| | | | |
|---|---|---|---|
| 2,411,238 | 11/1946 | Zender | 210—22 |
| 3,130,156 | 4/1964 | Neff | 210—321X |
| 3,228,876 | 1/1966 | Mahon | 210—321X |
| 3,276,996 | 10/1966 | Lazare | 210—22 |

FRANK A. SPEAR, JR., Primary Examiner

U.S. Cl. X.R.

210—321